Feb. 12, 1957 P. ZENCZAK 2,781,336
PROCESS FOR RECOVERY OF PRODUCTS FROM BARK
Filed Jan. 19, 1953 5 Sheets-Sheet 1

INVENTOR.
Piotr Zenczak
BY
Cook & Robinson
ATTORNEYS

Feb. 12, 1957 P. ZENCZAK 2,781,336
PROCESS FOR RECOVERY OF PRODUCTS FROM BARK
Filed Jan. 19, 1953 5 Sheets-Sheet 3

INVENTOR.
Piotr Zenczak
BY
Cook & Robinson
ATTORNEYS

Feb. 12, 1957 P. ZENCZAK 2,781,336
PROCESS FOR RECOVERY OF PRODUCTS FROM BARK
Filed Jan. 19, 1953 5 Sheets-Sheet 5
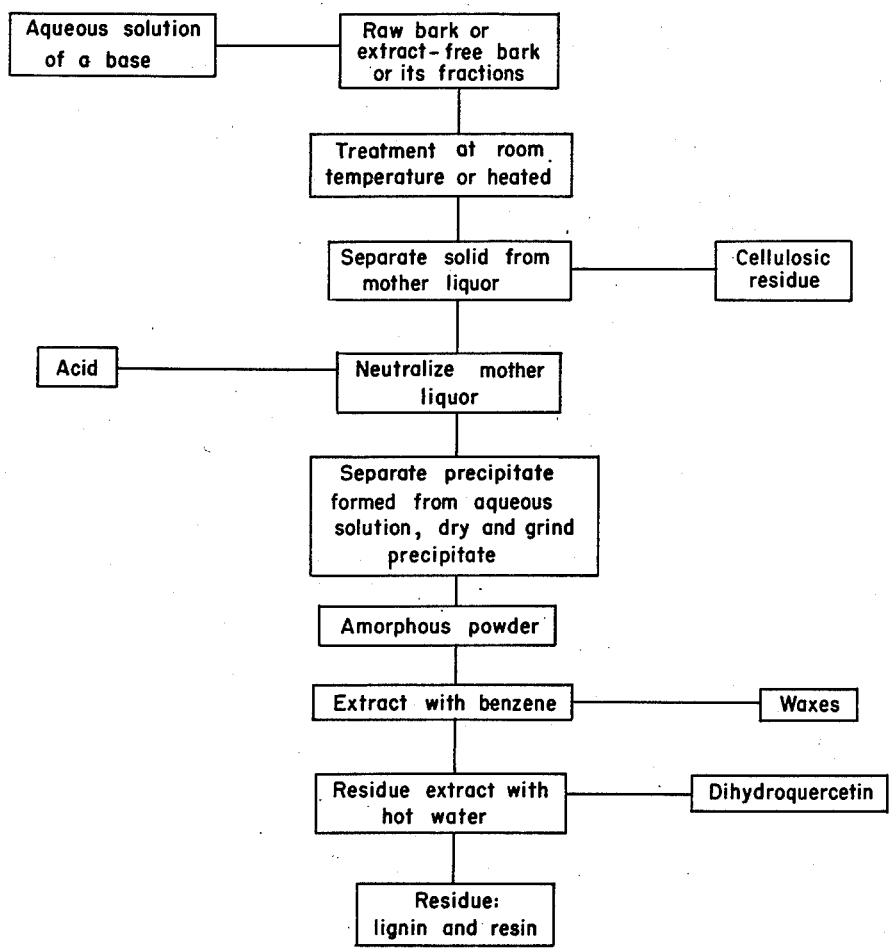
INVENTOR.
Piotr Zenczak
BY Cook & Robinson
ATTORNEYS United States Patent Office 2,781,336
Patented Feb. 12, 1957

2,781,336

PROCESS FOR RECOVERY OF PRODUCTS FROM BARK

Piotr Zenczak, Seattle, Wash.

Application January 19, 1953, Serial No. 331,801

13 Claims. (Cl. 260—108)

The present invention relates to novel waxes, resins, lignin and to a process for their production in commercial quantities from bark or its fractions which contain valuable waxes, tannin and resins.

It is known in the art that waxes and tannin may be removed from bark by a group of inert solvents such as benzene, hexene, ether or water and the residue is referred to as an extract free bark. My invention resides in a new and novel method of recovering valuable extractives from bark and further the production of additional and novel products from the extract free residue. More specifically, my invention makes possible the production and recovery of additional, valuable and novel waxes, resins and lignin products by a simple treatment of the raw bark or extract free bark with a strong alkali such as sodium hydroxide in alcoholic or aqueous solution at elevated or at room temperatures.

The present invention therefore affords for the first time a practical, economical method for the full chemical utilization of bark. Though my process may be fully or partially utilized for treatment of bark from various trees, such as Douglas fir, pine, oak, redwood and cedar, for the purpose of this application I will refer to Douglas fir bark. It is to be understood, however, that my invention is applicable to bark from many species of trees.

The inert chemical solvents such as aliphatic or aromatic hydrocarbons, ethers, alcohol, and water remove all extractives which are present in Douglas fir bark. The insoluble residue remaining after extraction is called "extract-free" and contains cellulose, lignin and other insoluble bark components. A survey of the literature shows a great lack of information concerning the chemical composition of this residue. It is usually described only as a mixture of cellulose and lignin.

Douglas fir bark or its fractions cork or powder, separated by mechanical methods such as grinding, screening and differential drying, is used as a raw material for the process of the present invention. Bark containing a considerable proportion of cork is particularly suitable for the purpose of the present invention since it gives higher yield of valuable products. The bark used must be reduced to particles to pass through a screen with approximately 3/8 inch perforations. Moisture content of this material is not critical and may range from 10% to 50% of dry weight of the bark.

The manner in which the bark or its fractions are chemically fully converted and separated into useful products such as waxes, resins, chemically active lignin and other compounds will be described with the reference to accompanying drawings, wherein:

Fig. 4 is a flow diagram illustrating my process for obtaining useful products from raw bark or from extract-free bark or its fractions by using an aqueous alkali solution.

Figure 1:
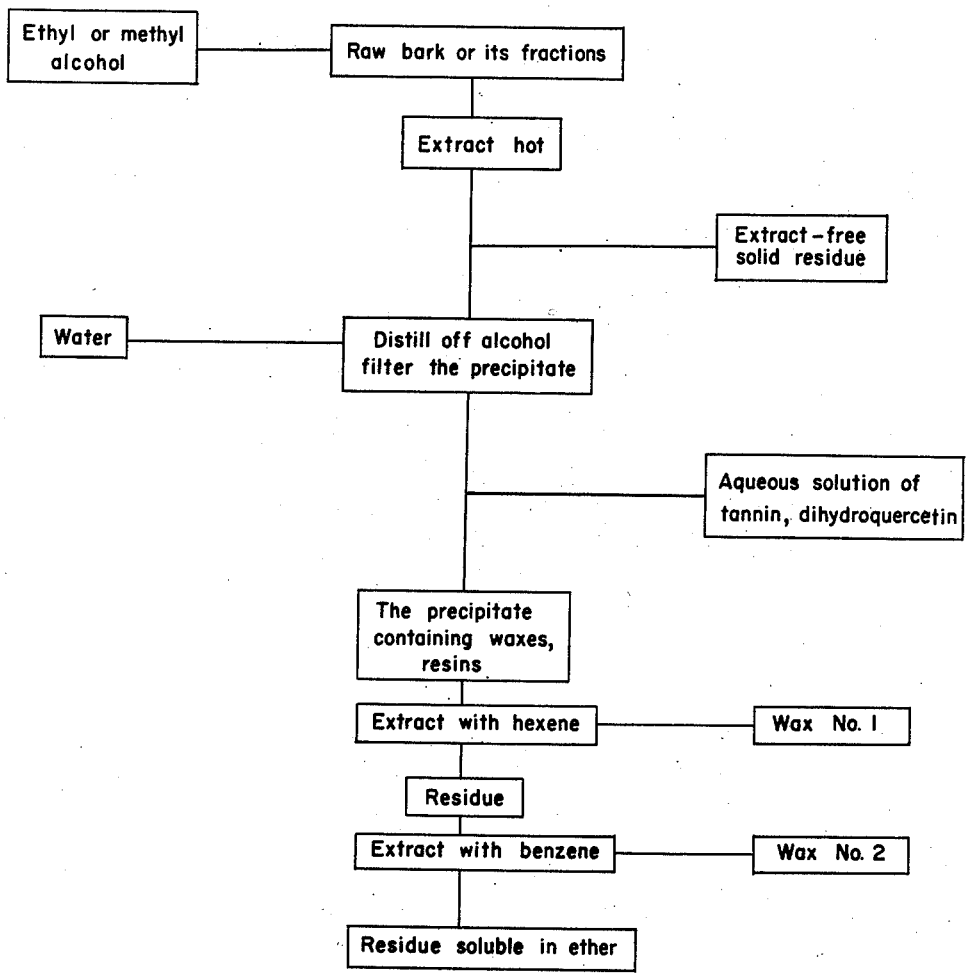
Fig. 1 is a flow diagram illustrating a one step process for removal of all extractives from Douglas fir bark or its fractions in accordance with the present invention.

The free extractives present in the bark can be removed according to the procedure outlined in Fig. 1 or by any other method which uses an inert solvent such as hexene, benzene ether or water.

In accordance with the procedure outlined in Fig. 1, Douglas fir bark or its powder or cork fractions or both are extracted with methyl or 95% ethyl alcohol at the reflux temperature of those solvents for a period of 1 to 4 hours depending on the type of apparatus used, the rate of circulation of the solvent and the size of the bark particles. Any suitable type of extraction apparatus may be used wherein a hot solvent is allowed to percolate continuously through a solid residue. The resulting solution of extractives in solvent is then withdrawn from the extraction vessel. The recovery of the solvent absorbed by solid residue is not necessary in cases where the residue will be further processed according to the procedure outlined in Figs. 2 or 4.

The alcoholic solution, containing the extractives, withdrawn from the extraction vessel is cooled and during cooling a white precipitate of wax is formed. This wax can be separated but wax obtained in this way is very brittle, and therefore I have found that it is advantageous not to separate the wax at this point of the process but to proceed as follows:

To the alcoholic filtrate, 10 to 20% of warm water by volume is added and the alcohol is distilled off and recycled. When the alcohol is removed the aqueous solution becomes cloudy and at this point the mixture is filtered or centrifuged to separate the precipitated waxes and resins from aqueous solution of tannin and dihydroquercetin.

The aqueous solution contains tannin and flavanone dihydroquercetin. Dihydroquercetin is insoluble in cold water and from the aqueous solution is recovered as a precipitate on cooling and standing. Dihydroquercetin can be oxidized to a well known quercetin. After the removal of dihydroquercetin the water soluble tannin are concentrated.

The solid precipitate, separated from aqueous solution, contain waxes, resins and condensed tannin. This solid is yellow in color and can be melted and when cool can be ground. In this form it is extracted with aliphatic hydrocarbon solvent such as e. g. n-hexene or n-pentane. Hexene extraction gives wax No. 1 of Fig. 1. This wax is light yellow in color and has the same properties as wax extracted directly from Douglas fir bark by hexene. Because the chemical composition and physical characteristics of this wax are previously known, I am not describing its properties other than saying that they are equal to wax obtained by n-hexene extraction of Douglas fir or similar bark.

Hexene extraction is followed by extraction with benzene or carbon tetrachloride. On evaporation, the solvent wax No. 2 in Fig. 1 is obtained which has clear, red-brown color and it has all the characteristics of wax obtained with benzene extraction of Douglas fir bark. The residue obtained by the two extractions is a brown, amorphous powder consisting mainly of condensed tannin.

I am aware that it has been proposed heretofore to extract the described waxes, dihydroquercetin and tannin from Douglas fir bark. The prior known practices, however, required the use of at least three different solvents in contact with the bark to extract hexene wax, benzene wax, tannin and dihydroquercetin. Bark is a bulky material and therefore the use of large amounts of three or four solvents represents serious problems for recovery of the solvents from the bark and from the extracts. To the contrary, my process requires use of only one master solvent in contact with bark and uses, in addition to the solvent, water as means for separating waxes from dihydroquercetin and tannin.

To obtain additional valuable products from extract-free bark or its fractions is the principal object of this invention.

Figure 2:
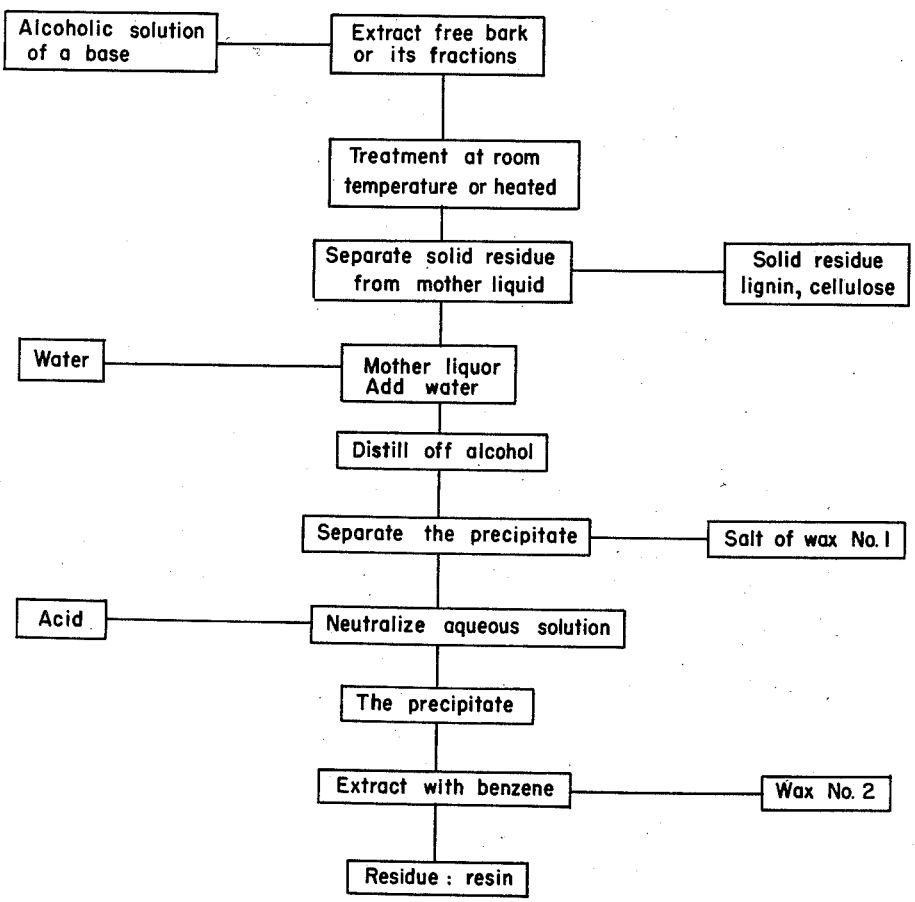
Fig. 2 is a flow diagram illustrating my process for obtaining waxes and resins from extract-free bark or its fractions using alcoholic solution of an alkali.
Figure 2A:
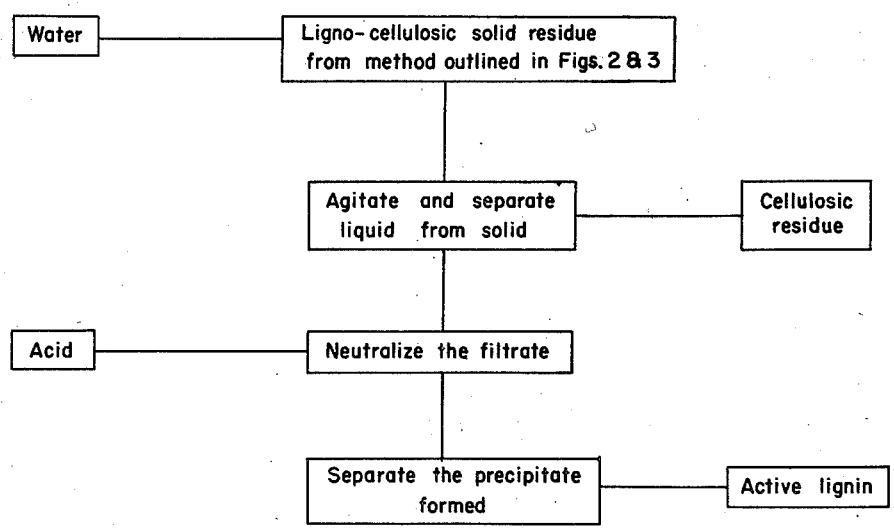
Fig. 2a is a flow diagram illustrating my process of obtaining active lignin from the lignin cellulose residue produced by the process illustrated in Fig. 2.

The procedures outlined in Figs. 2 and 2a are designed to isolate those additional, novel and valuable products. In my process the bark or extract-free bark or bark fractions are reacted with a reagent which is an alcohol solution containing a substance selected from bases which yield hydroxyl ions in an aqueous medium such as an alkali metal hydroxide and more specifically sodium hydroxide or potassium hydroxide. For the purpose of description in this application, the reacting solution will be referred to as an "alcoholic solution of a base." Higher temperature speeds the rate of reaction and the penetration of the solvent into bark particles but equally satisfactory results are obtained at room temperature (20° C.) with stirring and longer time for reaction. The amount of the alcoholic solution required is a minimum of 5 times the weight of raw material. The preferred proportion is 1 part of bark to 10 parts of liquid. The minimum time for reaction is 1 hour at temperatures approaching the boiling point of the alcohol used and 2 to 4 hours at room temperature. The concentration of the base, such as sodium hydroxide, in alcohol must be a minimum of 3% but the preferred concentration is 5% of sodium hydroxide in alcohol. The treatment may be conducted as a batch process or as a continued counter-current solid liquid extraction.

The extract solution, after extraction, is separated from the solid residue by filtration and the residue processed according to the method outlined in Fig. 2a.

To the filtrate, about 10 to 20% of water by volume is added and the alcohol is distilled off and recycled. After all alcohol is distilled off, the remaining alkaline, aqueous solution is cooled and the white precipitate formed during cooling is separated by filtration. This white precipitate is a cold water insoluble salt of wax No. 1 in Fig. 2. This salt has a melting point of 140° C. and is soluble in boiling water. It can be converted into wax by neutralization with a mineral acid such as sulfuric or hydrochloric giving a white hard wax, which has a sharp melting point of 66° C. and an aromatic odor. In its appearance and quality, it resembles the high grade carnauba wax. The yield of this wax from cork or powder fractions is from 10 to 15% of the dry weight of extract-free cork or bark powder.

The filtrate from separation of wax No. 1 is next neutralized with sulfuric acid and the new precipitate formed is separated from the mother liquor. This precipitate is resinous, sticky, light yellow and has a strong aromatic odor. From this resin with benzene a light yellow wax is extracted. This No. 2 wax after purification by removal of impurities with n-hexene or carbon tetrachloride is hard, non-sticky and has a melting point of 85° C. to 87° C. The residue is a dark brown sticky resin having strong adhesive properties and which gels to form a rubbery substance when heated. This resin is found to be a valuable water insoluble glue for wood and a raw material for plastics. The insoluble residue from the first step of this procedure is processed further as outlined in Fig. 2a.

Figure 3:
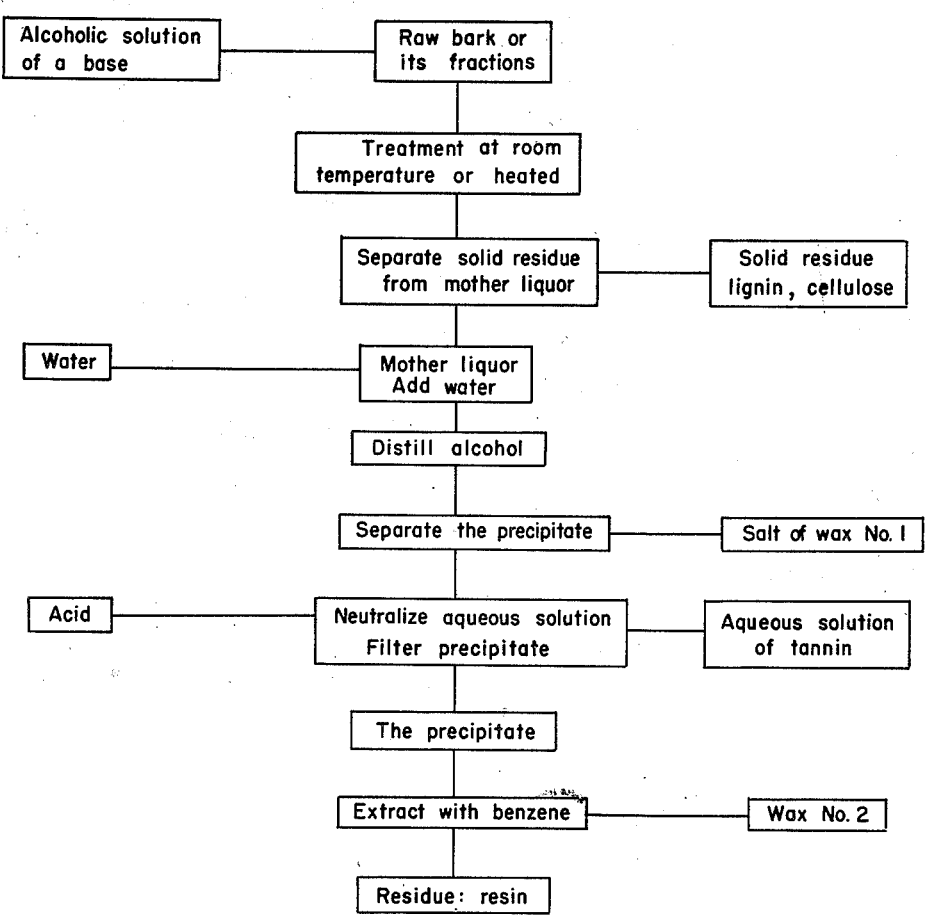
Fig. 3 is a flow diagram illustrating my process for obtaining products in accordance with the processes of Figs. 1 and 2 in a one-step process using alcoholic solution of an alkali.

Fig. 3 outlines a method by which all free extractives and additional components which are liberated by alcoholic solution of a base are extracted from the Douglas fir bark or its fractions in a one-step method. In accordance with this procedure, the bark is extracted with a 5% solution of sodium hydroxide in methyl or ethyl alcohol at their reflux temperatures for a period of 1 to 3 hours. Ten parts of the solvent per one part of raw material is used in case of a batch process although it is preferred to use an extracting system wherein the solution is allowed to percolate continuously through a quantity of the bark. The resulting solution of extractives in alcoholic sodium hydroxide is withdrawn hot from the extraction vessel. The solid residue separated from the solution is washed with warm alcohol and processed according to the method outlined in Fig. 2a.

To the filtrate, 10 to 20% water by volume is added and the alcohol is distilled off. On cooling of the aqueous solution, a precipitate is formed and removed by filtration. This precipitate, after washing with cold water and neutralization with an acid, is melted giving the light yellow wax No. 1 of Fig. 3. This wax is a mixture of wax No. 1 described in method outlined in Fig. 2 and hexene wax as present in bark.

The aqueous solution, after separation of the wax No. 1, is neutralized with sulphuric acid. The resinous precipitate produced is separated from the aqueous solution.

This resinous precipitate is light yellow in color and has a pleasant aromatic odor. By extraction with hexene, benzene and hot water, the hexene wax, the benzene wax and dihydroquercetin is extracted. The residue is a sticky, brown resin of the same character as the resin obtained by the method outlined in Fig. 2. The aqueous filtrate from separation of resin No. 1 contains water soluble degradation products together with water soluble tannins.

This solid residue obtained by the method of Fig. 2 or Fig. 3 consists primarily of lignin and cellulose and is further processed as outlined in Fig. 2a. To it, 5 to 10 parts of water is added and the mixture is stirred well, and filtered or centrifuged from the insoluble part. The insoluble part will contain cellulosic residue. All lignin is dissolved in the filtrate. The filtrate is neutralized with a strong acid, such as sulfuric and the precipitate formed is separated from the water which contains the water soluble components of the bark. The lignin so obtained is a light brown paste which dries into a yellow, finely divided, water insoluble powder. This lignin has a low melting point at about 150° C. Chemically it is active and condenses with furfural and phenol at room temperature. It is soluble in lower aliphatic alcohols at room temperature and partly soluble in ether, acetone and chloroform. It is completely soluble in diluted sodium hydroxide. The foregoing properties of this lignin make it useful as an adhesive. Under pressure and in presence of water, it flows at temperatures below 130° C. Dissolved in diluted sodium hydroxide it forms an interior type glue for plywood. Under acidic conditions, a waterproof exterior type plywood glue or binder for hardboard was prepared. Dissolved in solvents, it may be used in formulating surface coating materials. It may be molded under heat and pressure and it may be modified with filler and, or plasticizer for this purpose.

Fig. 4 outlines a method according to which total bark or extract-free bark or its fractions are treated at room temperature or at temperatures below the boiling point of the water with a 5% aqueous solution of sodium hydroxide. This method eliminates the use of a volatile organic solvent for separation of useful products such as waxes and resins from Douglas fir bark or its fractions. The use of a series of volatile organic solvents is restricted only to the separation of those products after they are removed from the bark.

The aqueous 3% to 5% solution of sodium hydroxide is used and the bark is extracted continuously in any suitable extraction apparatus. The limit of extraction is reached in 2 to 4 hours. The mother liquor is separated from the solid, mainly cellulosic, residue and neutralized with a strong mineral acid or in case that a recovery of the sodium hydroxide is desirable, with carbon dioxide, to obtain sodium carbonate which can be converted to sodium hydroxide by milk of lime.

The precipitate formed is separated from mother liquor. The precipitate, a brown paste, which on drying gives a brown amorphous powder, is extracted with benzene for recovery of all waxes or with hot water for recovery of dihydroquercetin and tannin. The residue contains lignin and resin, and can be separated into ether soluble and ether insoluble fractions.

The following examples illustrate each of four methods and products obtained in accordance with the teaching of the present invention.

*Example No. 1*

100 grams of oven dry weight of Douglas fir bark corky fraction, particle sized to pass through a 14 mesh screen, was extracted in a Soxhlet type, solid liquid extractor for a period of four hours, with 95% ethyl alcohol. The resulting solution was separated from extract-free cork by filtration. To the filtrate, 20 percent by volume of warm water was added and the alcohol was distilled off. The cloudy aqueous solution, yellow in color, was filtered while warm to separate the precipitated light brown, waxy material. The wax cake was melted producing a brown waxy substance which yielded 20 grams or 20% of the weight of the cork.

The warm aqueous filtrate containing water soluble tannin and dihydroquercetin was cooled. On cooling and standing overnight, a white precipitate was formed. This precipitate was separated from the aqueous solution by filtration and dried in an oven at 60° C. producing a fine white powder of dihydroquercetin which had a melting point of 240° C. and yielded 5 grams. The aqueous solution was not further investigated.

The melted waxy precipitate was extracted in a small Soxhlet extractor with an n-hexene. After evaporation of the solvent, a solid, hard, light yellow wax with a melting point of 62 to 63° C. was obtained. The yield was 8 grams or 8% of the corky fraction of the Douglas fir bark.

The residue left after hexene extraction was then extracted with benzene in the same extractor. After evaporation of the solvent, a reddish-brown hard resinous wax was obtained with a melting point 60° C. The yield was 5 grams or 5% of the cork. The residue, a brown powder, was then separated into ether (diethyl ether) soluble and ether insoluble fractions. The ether soluble fractions, after evaporation of ether, leave a brown brittle solid containing same dihydroquercetin with impurities. The ether insoluble fractions, a brown amorphous powder, consists mainly of condensed tannin (phlobaphenes).

*Example No. 2*

100 grams of Douglas fir bark powder (phloem part of bark exclusive of the bast fibers) extract-free was heated at a temperature of about 60° C. in an open beaker with one liter of 5% alcoholic (95% ethanol) solution of sodium hydroxide. The mixture was stirred from time to time. After one hour the solid residue was filtered from the mother liquor and washed with ethanol. The solid residue was processed further according to the procedure described in Example No. 3.

To the filtrate, 100 milliliters of warm water was added and the ethanol was recovered by distillation. The aqueous solution was cooled and on cooling a heavy precipitate was formed. This precipitate was separated from mother liquor by filtration. It was washed twice with ice cold water producing a snow white cake of sodium salt of wax No. 1, Fig. 2. This salt was dissolved in hot water (70° C.) and neutralized with sulphuric acid. On neutralization, a white precipitate was formed, which after filtration was melted, giving a hard white wax which melts at 65° C. The yield was 10 grams or 10% of the bark powder extract-free.

The alkaline aqueous solution obtained as a filtrate on removal of the salt of wax No. 1 was neutralized with sulphuric acid. After neutralization a yellow resinous precipitate of strong aromatic odor was formed. It was separated by filtration from aqueous mother liquor.

This yellow resin was dehydrated by melting. The weight of the melted resin was 18 grams or 18% of the weight of the extract-free bark powder. It was extracted with benzene in a small Soxhlet extractor. The benzene extract was purified by precipitation with hexene and the so obtained white precipitate was melted to give wax No. 2 in Fig. 2. The yield of this wax was 9 grams. The melting point was 85 to 87° C. It was light brown in color.

The residue was a dark, sticky resin which is thermoplastic but on heating gels forming a rubbery substance. This resin was tested as an adhesive for wood with positive results.

*Example No. 3*

To 50 grams of solid residue from Example No. 2, 500 milligrams of water was added and the mixture stirred well and filtered from the insoluble part. The insoluble part consisting mainly of cellulose, was not processed further. The filtrate, a dark brown aqueous solution, was neutralized with sulphuric acid and the precipitate formed was separated from the mother liquor by filtration. The precipitate was a light brown paste which was dried in an oven at 60° C. After drying a light brown, fine, amorphous lignin powder was obtained. The yield was 39 grams. The lignin has properties previously described.

*Example No. 4*

100 grams dry weight of extract-free Douglas fir bark corky fraction of particle size to pass a 14 mesh screen was treated at a temperature of 20° C. (room temperature) in a beaker with one liter of 5% alcoholic solution of sodium hydroxide. The mixture was stirred from time to time. After three hours the solid residue was filtered from the mother liquor and washed with ethanol. The solid residue was processed further according to the procedure described in Example No. 3.

To the filtrate, 100 milligrams of warm water was added and the ethanol was recovered by distillation. The aqueous solution was cooled and on cooling a heavy precipitate was formed. This precipitate was separated from the mother liquor by filtration. After washing, a yellow white sodium salt of wax was obtained. This salt was dissolved in hot water and neutralized with sulphuric acid. The precipitated wax was melted and produced 18 grams of light yellow hard wax. This wax has a melting point (A. S. T. M. C.) 63 to 66° C.

The alkaline aqueous solution obtained as a filtrate, on the removal of the cold water insoluble salt of the wax, was neutralized with sulphuric acid. On neutralization, a yellow resin was formed. It was separated by filtration and melted giving 21 grams of a light brown resinous solid. This solid was extracted with carbon tetrachloride. After evaporation of the solvent, 2 grams of a light yellow fat was obtained. The residue was extracted with benzene giving of evaporation 12 grams of light brown tacky wax with a melting point of 80° C.

As residue, a black resin was left with the same characteristics as the resin in Example No. 2.

*Example No. 5*

100 grams of total Douglas fir bark, of particle size to pass a 14 mesh screen, was heated in beaker at a temperature of 80° C. with 1000 milliliters of 5% aqueous solution of sodium hydroxide. The mixture was stirred from time to time. After 3 hours, the solid residue was filtered and washed with warm water. The solid residue, consisting mainly of cellulose was not processed further.

The filtrate, a dark brown aqueous solution, was neutralized with sulphuric acid. The precipitate formed was separated from the mother liquor by filtration producing a brown paste. It was dried in an oven at 50° C. and ground to a brown amorphous powder. The yield was 50 grams. The mother liquor, containing water soluble tannin and degradation products, was disregarded.

This brown powder was next extracted in a Soxhlet extractor with hexene giving 8 grams of a light yellow hard wax having a melting point of 62 to 65° C. The residue remaining in the extractor was extracted with benzene giving a reddish, light brown wax with a melting point of 60 to 63° C. The yield of benzene wax was 10 grams. The residue was extracted with ether and on evaporation of the ether produced 15 grams of a brown, brittle resin. The ether insoluble part, a brown, amorphous powder, consists of ether extract-free lignin.

In the following claims, the word "bark" is used to designate the bark, or any of its fractions, of any tree for which the present process is applicable. The "extract-free" bark is to be understood to be that bark or any of its fractions from any tree that has been extracted by previously known means, as set out in the several paragraphs of the specification.

Having thus described my invention, what I claim as new therein, and desire to secure by Letters Patent, is:

1. The process of producing reaction products from bark which consists of reacting the bark with an alcoholic solution of an alkali metal hydroxide to produce a liquor containing the desired products, said reaction taking place at atmospheric pressure and within the range of atmospheric temperature and the reflux temperature of the solution, said alcoholic solution containing at least 5% water and the alcohol being a lower aliphatic alcohol separating solid residue from said liquor, and recovering the products from the separated liquor.

2. The process as defined in and by claim 1 wherein the products are obtained from Douglas fir bark.

3. The process as defined in and by claim 1 wherein the alcoholic solution of an alkali metal hydroxide is alcohol and sodium hydroxide.

4. The process as defined in and by claim 1 wherein the products are obtained from Douglas fir bark and the alcohol solution of an alkali metal hydroxide is alcohol and sodium hydroxide.

5. The process of producing wax from bark which comprises reacting the bark with an alcoholic solution of an alkali metal hydroxide to produce a liquor containing the desired wax, separating the solid residue from said liquor and adding water to the separated liquor, distilling the alcohol from the separated liquor, and then cooling the liquor to obtain a salt of wax precipitate and then filtering to separate the precipitate and a filtrate, neutralizing the precipitate with acid, and obtaining a wax therefrom.

6. The process as defined in and by claim 5 wherein the wax is obtained from Douglas fir bark.

7. The process as defined in and by claim 5 wherein the alcoholic solution of an alkali metal hydroxide is alcohol and sodium hydroxide.

8. The process as defined in and by claim 5 wherein the wax is obtained from Douglas fir bark and the alcoholic solution of an alkali metal hydroxide is alcohol and sodium hydroxide.

9. The process of treating an extract-free bark to obtain valuble products therefrom, comprising reacting the extract-free bark with an alcoholic solution of an alkali metal hydroxide, filtering the solid residue from the mother liquor, adding water to the liquor, separating the alcohol from the aqueous solution and then cooling the solution, to obtain a cold water insoluble precipitate and removing the precipitate from the solution, neutralizing the filtrate with acid, and separating the precipitate from the neutralized filtrate, and extracting it with a hydrocarbon solvent to obtain a wax.

10. The process of treating an extract-free bark to obtain valuble products therefrom, comprising reacting the extract-free bark with an alcoholic solution of an alkali metal hydroxide, filtering the solid residue from the mother liquor, adding water to the liquor, separating the alcohol from the liquor, and then cooling the liquor, to obtain a cold water insoluble precipitate and removing the precipitate from the liquor, and neutralizing it with acid and separating the precipitate therefrom to obtain a wax.

11. The process of treating bark to obtain valuble products therefrom, comprising treating the bark with an alcoholic solution of an alkali metal hydroxide, separating the solid ligno-cellulosic residue from the mother liquor, adding water to the mother liquor, distilling the alcohol from the aqueous mixture, separating the insoluble precipitate therefrom by cooling and then filtering, neutralizing the aqueous solution with acid, separating the precipitate therefrom and extracting it with a hydrocarbon solvent to obtain wax.

12. The process of treating bark to obtain valuble products therefrom, comprising treating the bark with an alcoholic solution of an alkali metal hydroxide, separating the solid ligno-cellulosic residue from the mother liquor, adding water to the mother liquor, distilling the alcohol from the aqueous solution, separating the insoluble precipitate therefrom by cooling and then filtering, neutralizing the insoluble precipitate with acid, then separating the precipitate therefrom to obtain a wax.

13. The process of producing resin from bark which comprises reacting the bark with an alcohol solution of an alkali metal hydroxide to produce a liquor containing the desired resin, separating the solid residue from said liquor and adding water to the separated liquor, distilling the alcohol from the separated liquor, cooling the liquor to form a precipitate, and then filtering to separate the precipitate and a filtrate, neutralizing the filtrate to obtain a second precipitate and recovering a resin from the second precipitate.

References Cited in the file of this patent

UNITED STATES PATENTS

| Number | Name | Date |
|---|---|---|
| 783,367 | Craighill | Feb. 21, 1905 |
| 941,401 | Wynberg | Nov. 30, 1909 |
| 2,181,791 | Price | Nov. 28, 1939 |
| 2,377,183 | Reed | May 29, 1945 |
| 2,534,250 | De Eds et al. | Dec. 19, 1950 |
| 2,571,221 | Dupont et al. | Oct. 16, 1951 |
| 2,608,560 | Aschmer et al. | Aug. 26, 1952 |
| 2,645,633 | Richmond et al. | July 14, 1953 |
| 2,662,893 | Kurth | Dec. 15, 1953 |

FOREIGN PATENTS

| 695,624 | Germany | Aug. 29, 1940 |